(12) United States Patent
Schwartz et al.

(10) Patent No.: US 9,531,703 B2
(45) Date of Patent: Dec. 27, 2016

(54) SINGLE SIGN-ON VIA APPLICATION OR BROWSER

(71) Applicant: Microsoft Technology Licensing, LLC., Redmond, WA (US)

(72) Inventors: Jonathan D. Schwartz, Seattle, WA (US); Karanbir Singh, Seattle, WA (US); Christopher L. Walstad, Seattle, WA (US); Sainath Narendranath Thadkal, Bellevue, WA (US); Aleksandr Radutskiy, Redmond, WA (US); Yifan Wang, Bellevue, WA (US); Vishal Agarwal, Kirkland, WA (US); Octavian T. Ureche, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 32 days.

(21) Appl. No.: 14/563,927

(22) Filed: Dec. 8, 2014

(65) Prior Publication Data

US 2016/0112402 A1 Apr. 21, 2016

Related U.S. Application Data

(60) Provisional application No. 62/066,742, filed on Oct. 21, 2014.

(51) Int. Cl.
*H04L 29/06* (2006.01)
*H04L 29/08* (2006.01)

(52) U.S. Cl.
CPC ....... *H04L 63/0815* (2013.01); *H04L 63/0807* (2013.01); *H04L 67/02* (2013.01)

(58) Field of Classification Search
CPC .... H04L 63/0815; H04L 63/083; H04L 63/08; G06F 21/41; G06F 21/31
(Continued)

(56) References Cited

U.S. PATENT DOCUMENTS 7,478,434 B1 1/2009 Hinton et al.
7,631,346 B2 12/2009 Hinton et al.
(Continued)

FOREIGN PATENT DOCUMENTS

WO WO-2012072099 6/2012

OTHER PUBLICATIONS

"Cisco Jabber for Windows 9", Retrieved from <http://www.cisco.com/c/en/us/td/docs/voice_ip_comm/jabber/Windows/9_6/InstallConfig/JABW_BK_CDFE9752_00_installation-and-configuration/JABW_BK_CDFE9752_00_installation-and-configuration_chapter_0100.html> on Nov. 11, 2014, Dec. 18, 2013, 13 pages.
(Continued)

*Primary Examiner* — Baotran N To
(74) *Attorney, Agent, or Firm* — Tim Churna; Dan Choi; Micky Minhas

(57) ABSTRACT

Single sign-on techniques via an application or browser are described. In one or more implementations, a single instance of entry of authentication information is received that is entered via interaction with an application or browser of a computing device. Responsive to this receipt, the single instance of the entry of authentication information is used by the computing device automatically and without user intervention to cause authentication to obtain access to one or more network services that are accessible via a network by the application and the browser.

17 Claims, 12 Drawing Sheets

(58) Field of Classification Search
USPC .............................................................. 726/8
See application file for complete search history.

(56) References Cited

U.S. PATENT DOCUMENTS

| | | | |
|---|---|---|---|
| 7,793,342 | B1 | 9/2010 | Ebrahimi et al. |
| 8,793,509 | B1* | 7/2014 | Nelson ................. G06F 21/335 380/227 |
| 8,799,640 | B2 | 8/2014 | Mukkara et al. |
| 8,832,782 | B2 | 9/2014 | Hyndman et al. |
| 2011/0209210 | A1 | 8/2011 | Miller et al. |
| 2011/0213956 | A1* | 9/2011 | Mukkara ................. H04L 63/20 713/152 |
| 2013/0086657 | A1 | 4/2013 | Srinivasan et al. |

OTHER PUBLICATIONS

"Understanding Mobile and Social", Fusion Middleware Administrator's Guide for Oracle Access Management. Retrieved from <https://docs.oracle.com/cd/E27559_01/admin.1112/e27239/oicunderstandingoic.htm#AIAAG7208> on Oct. 17, 2014, Nov. 28, 2012, 25 pages.

"SAML-Based SSO Solution", Retrieved from <http://www.cisco.com/c/en/us/td/docs/voice_ip_comm/cucm/SAML_SSO_deployment_guide/10_0_1/CUCM_BK_SB003832_00_saml-sso-deployment-guide-for/CUCM_BK_SB003832_00_saml-sso-deployment-guide-for_chapter_01.html> on Nov. 11, 2014, Dec. 6, 2013, 3 pages.

Armando, et al., "From Multiple Credentials to Browser-based Single Sign-On: Are We More Secure?", In 26th IFIP TC 11 International Information Security Conference, Jun. 7, 2011, 12 pages.

Armando, et al., "Formal Analysis of SAML 2.0 Web Browser Single Sign-On: Breaking the SAML-based Single Sign-On for Google App", In Proceedings of the 6th ACM workshop on Formal methods in security engineering, Oct. 27, 2008, 9 pages.

James, "Web Single Sign-On Systems", Retrieved from <http://www.cs.wustl.edu/~jain/cse571-07/ftp/websso/> on Nov. 11, 2014, Dec. 2007, 12 pages.

\* cited by examiner

1100 ⟶

1102
Responsive to a request for one or more cookies from a browser of a computing device that is usable to access one or more network services, cause an application to form a communication that includes authentication information to be communicated to a service by the computing device via a network

1104
Communicate the one or more cookies received by the application, responsive to the formed communication, to be stored in cookie storage by the computing device such that the one or more cookies are usable by the browser and the application to access the one or more network services automatically and without user intervention

*Fig. 11*

SINGLE SIGN-ON VIA APPLICATION OR BROWSER

RELATED APPLICATIONS

This application claims priority to U.S. Provisional Patent Application No. 62/066,742, filed Oct. 21, 2014, and titled "Single Sign-on via Application or Browser," the entire disclosure of which is hereby incorporated by reference.

BACKGROUND

To access network services such as a social network service, sports websites, and so on, users are required to login multiple times using conventional techniques. For example, a user may access a website of a network service, e.g., a social network service, via a browser and therefore provide a user name and password to access an account of the user.

The user may also access the network service via a dedicated application, such as an application coded by a provider of the web site to upload a photo to the social network service. To obtain this access, the dedicated application is also forced to provide the user name and password to access the account of the user. This is because under conventional techniques the browser and the application are segregated on separate "islands" by an operating system, typically to reduce a chance of exploitation by malicious parties.

SUMMARY

Single sign-on techniques via an application or browser are described. In one or more implementations, a single instance of entry of authentication information is received that is entered via interaction with an application or browser of a computing device. Responsive to this receipt, the single instance of the entry of authentication information is used by the computing device automatically and without user intervention to cause authentication to obtain access to one or more network services that are accessible via a network by the application and the browser.

In one or more implementations, a push mechanism is described. For example, responsive to a request formed by a first application of a computing device for one or more cookies that are usable to access one or more network services, calls are routed to a second application of the computing device to receive authentication information. Responsive to the receipt of the authentication information, a communication is formed by the second application that includes the authentication information to be communicated to a service by the computing device via a network. The one or more cookies are received via the network from the service in response to authentication by the service using the authentication information of the communication and stored in cookie storage by the computing device. The stored one or more cookies are usable by the second application to access the network service automatically and without user intervention.

In one or more implementations, a pull mechanism is described. For example, responsive to a request for one or more cookies from a browser of a computing device that is usable to access one or more network services, an application is caused to form a communication that includes authentication information to be communicated to a service by the computing device via a network. The one or more cookies received by the application, responsive to the formed communication, are caused to be stored in cookie storage by the computing device such that the one or more cookies are usable by the browser and the application to access the one or more network services automatically and without user intervention.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 11 is a flow diagram depicting a procedure in an example implementation in which a pull mechanism utilized to support single sign-on techniques is described.

DETAILED DESCRIPTION

Overview

On conventional operating systems today, users are forced to login at least twice, once in the browser and then once again in an application in order to obtain access to network services, such as by using a browser and an application provided by the network service. This is because browsers and applications live in two disconnected islands in conventional operation systems.

Single sign-on techniques via an application or browser are described. In one or more implementations, an operating system includes a token broker module that is configured to support entry of a single instance of authentication information to be used by both a browser and an application to access a network service. The token broker module, for instance, may leverage a single sign-on service that is accessible via a network to obtain and store cookies in storage that are usable to access the network services.

For example, a user may enter authentication information via a browser or application to access the network service and have that authentication information also leveraged by another application to gain access by the application without reentry of the information. The reverse is also true in which a user may enter the authentication information via the other application and have that authentication information leveraged by the browser or application to also support access via a network. A variety of mechanisms may be employed to support these techniques, include a push mechanism from application to application, a pull mechanism, and so on. Further discussion of these and other examples may be found in relation to the following sections.

In the following discussion, an example environment is first described that may employ the single sign-on techniques described herein. Example procedures are then described which may be performed in the example environment as well as other environments. Consequently, performance of the example procedures is not limited to the example environment and the example environment is not limited to performance of the example procedures.

Example Environment

Figure 1:
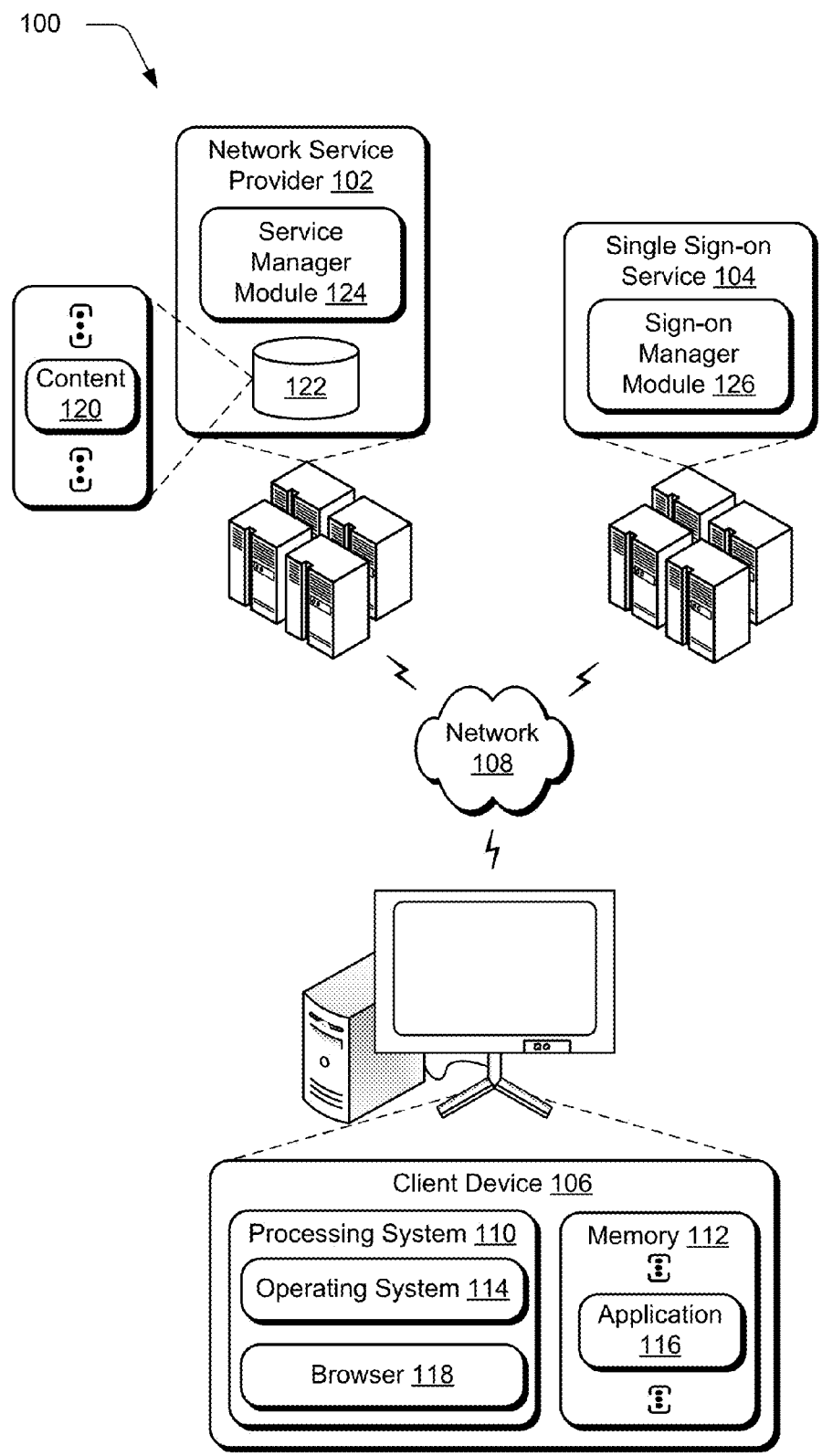
FIG. 1 is an illustration of an environment in an example implementation that is operable to perform single sign-on techniques via an application or browser.

FIG. 1 is an illustration of an environment 100 in an example implementation that is operable to employ the single sign-on techniques described herein. The illustrated environment 100 includes a network service provider 102, a single sign-on service 104, and a client device 106 that are communicatively coupled, one to another, via a network 108. Computing devices that may implement the network service provider 102, the single sign-on service 104, and the client device 106 may be configured in a variety of ways.

For example, a computing device may be configured as a computer that is capable of communicating over the network 108, such as a desktop computer, a mobile station, an entertainment appliance, a set-top box communicatively coupled to a display device, a wireless phone, a game console, and so forth. Thus, a computing device may range from full resource devices with substantial memory and processor resources (e.g., personal computers, game consoles) to a low-resource device with limited memory and/or processing resources (e.g., traditional set-top boxes, handheld game consoles). Additionally, although a single computing device is shown, the computing device may be representative of a plurality of different devices, such as multiple servers utilized by a business to perform operations such as by the network service provider 102 and single sign-on service 104, a remote control and set-top box combination, an image capture device and a game console configured to capture gestures, and so on.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

The client device 106 as illustrated includes a plurality of hardware components, examples of which include a processing system 110 and an example of a computer-readable storage medium illustrated as memory 112. The client device 106 is further illustrated as including an operating system 114. The operating system 114 is configured to abstract underlying functionality of the computing device 102 to applications 116 and a browser 118 that are executable on the client device 106.

For example, the operating system 114 may abstract processing, memory, network, and/or display functionality of the client device 106 such that the applications 116 may be written without knowing "how" this underlying functionality is implemented. The applications 116, for instance, may provide data to the operating system 114 to be rendered and displayed by a display device without understanding how this rendering will be performed.

The operating system 114 may also represent a variety of other functionality, such as to manage a file system and user interface that is navigable by a user of the client device 106. An example of this includes implementation of single sign-on functionality. For example, the client device 106 may access content 120 (e.g., webpages, music, photos, and so on), that is stored in storage 122 of the network service provider 102 via the network 108 through use of one or more of the applications 116, the browser 118, and so on. The one or more applications 116, for instance, may be configured as dedicated applications 116 that are provided by the network service provider 102 to access the content 120 through interaction with a service manager module 124 that is representative of functionality to manage and expose content 120 for access via the network 108.

As previously described, the client device 106 may use the applications 116 and/or browser 118 to access the content 120 of the network service provider 102. Conventionally, however, this required separate logins from each point of entry, which is considered frustrating and inefficient to users. Accordingly, the network service provider 102 and the client device 106 may leverage a single sign-on service 104. The single sign-on service 104 is illustrated as including a sign-on manager module 126 that is representative of functionality to communicate with the application 116 and browser 118 to support a single sign-on. A variety of different mechanisms may be employed to support these techniques, such as a push mechanism, examples of which are described in relation to FIGS. 2 and 3. A pull mechanism may also be employed, examples of which are described in relation to FIGS. 4 and 5. These techniques may also include use of a nonce, which may be utilized to verify requests and thus provide additional security and support third-party browsers, examples of which are described in relation to FIGS. 6-8.

Figure 2:
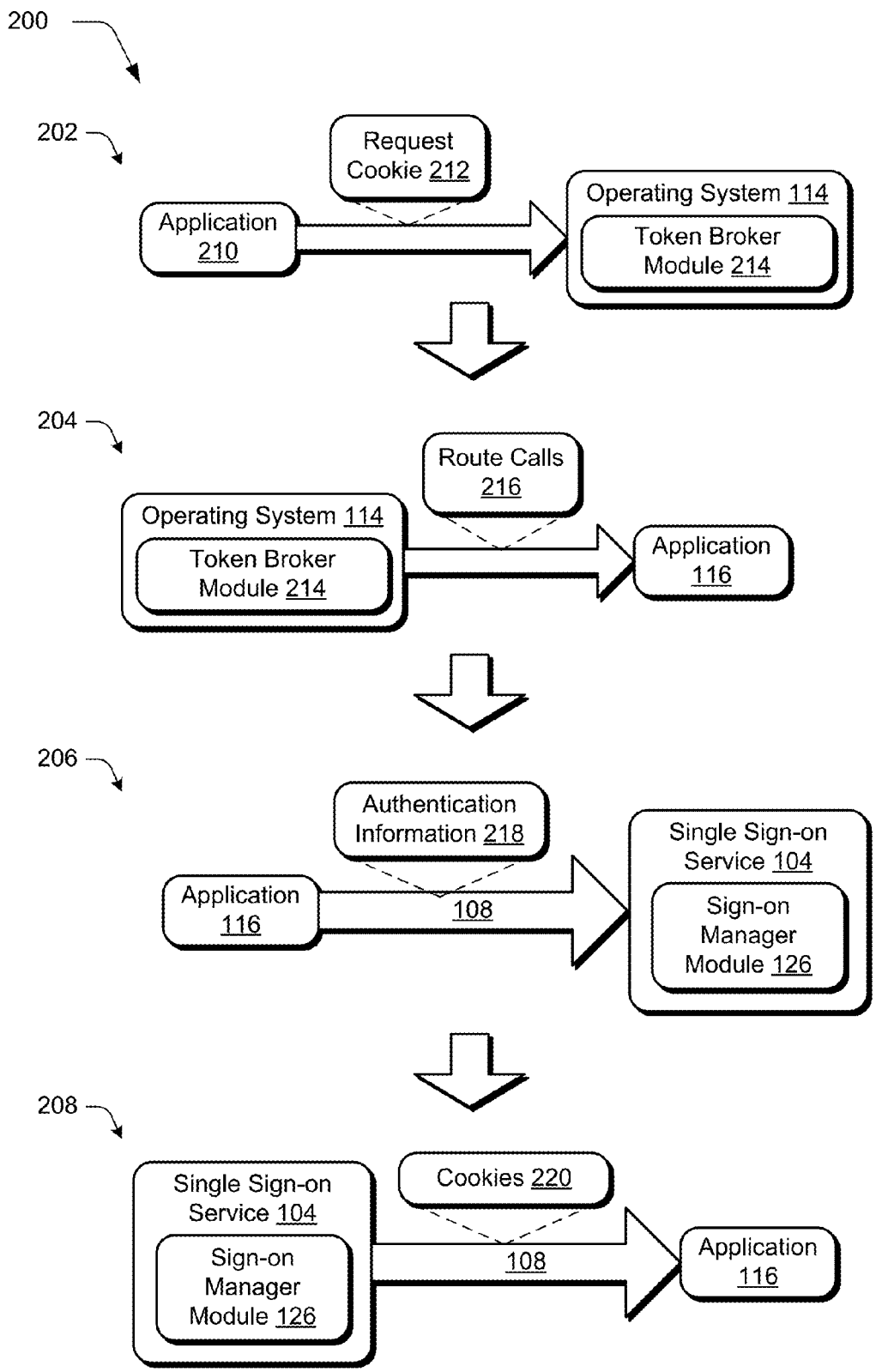
FIG. 2 depicts a system in an example implementation in which a push mechanism is employed to support single sign-on techniques.

FIG. 2 depicts a system 200 in an example implementation in which a push mechanism is employed to support single sign-on techniques. The system 200 is illustrated as including first, second, third, and fourth stages 202, 204, 206, 208. At the first stage 202, an application 210 requests cookies 212 (e.g., tokens) from a token broker module 214 of an operating system 114 that are usable to access a network service 102. In the following discussion, cookies 212 are also representative of tokens that are usable to gain network access, and thus cookies 212 refer to both cookies included in a header (e.g., a traditional cookie) or in a request body (e.g., a traditional token).

The application 210, for instance, may be configured as a game, an image editing application, and so on that is executed by the client device 106. As part of the interaction with the application 210, a user may wish to share information with a network service, such as a high score in a game with a social network service, an edited image as part of an image sharing service, and so on.

The token broker module 214 is representative of functionality of the operating system 114 in this example to manage access to network services 102 by support of single sign-on functionality. The token broker module 214, for instance, may include functionality as well as leverage functionality available both on the client device 106 and elsewhere (e.g., the single sign-on service 104) to support communication of authentication information and cookies to support this access.

For example, at the second stage 204 the token broker module 214 may locate an application 116 of the client device 106 that corresponds to the requested network service 102. The network service 102, for instance, may be configured as a social network service (e.g., Facebook®, Twitter®, LinkedIn®, and so on) and the dedicated application 116 may be configured to support interaction with the network service 102 via the network 108. Accordingly, once the application 116 is located by the token broker module 214 calls are routed 216 to the application 116 to obtain access.

As shown in the third stage 206, this may include receipt of a single instance of authentication information 218 (e.g., user name, password, fingerprint scan, eye scan, gesture, and so on) that is then provided by the application 116 via a network to a single sign-on service 104. The single sign-on manager module 126 of the service may then verify the authentication information 218 and, once verified, provide cookies 220 via the network 108 to the application as shown in the fourth stage 208. These cookies 220 may then be utilized to support access to the network service provider 104 (i.e., a single sign-on) by a plurality of different applications, an example of which is described in the following and is shown in a corresponding figure.

Figure 3:
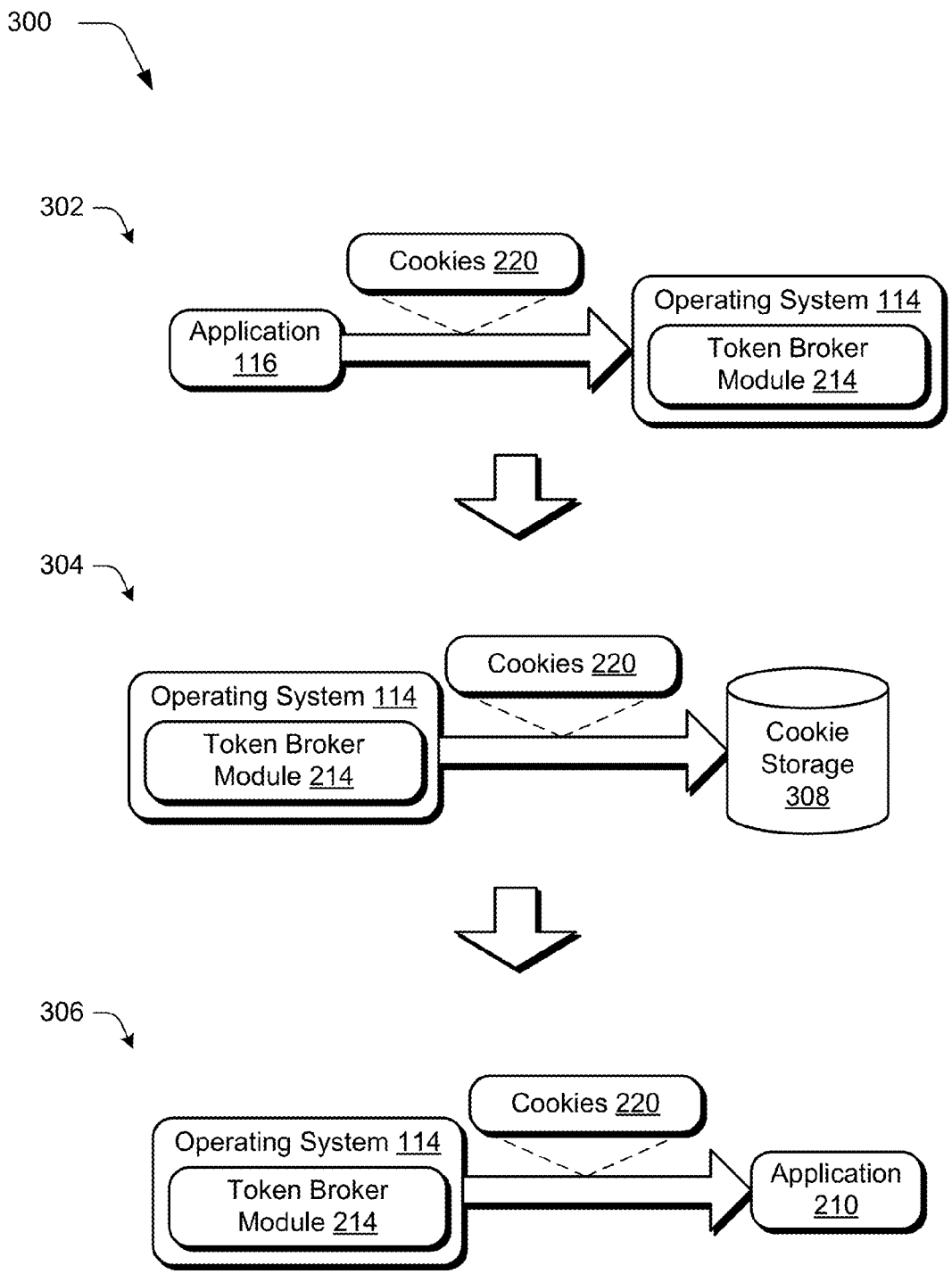
FIG. 3 depicts a system in an example implementation in which cookies obtained as described in FIG. 2 are employed to support single sign-on for a plurality of different applications automatically and without user intervention.

FIG. 3 depicts a system 300 in an example implementation in which cookies obtained as described in FIG. 2 are employed to support single sign-on for a plurality of different applications automatically and without user intervention. The system 300 is illustrated using first, second, and third stages 302, 304, 306. At the first stage 302, the application 116 communicates the cookies 220 received from the single sign-on service 104 to the token broker module 214 of the operating system 114.

At the second stage 304, the token broker module 214 stores the cookies 220 in cookie storage 308. Cookie storage 308 (i.e., a cookie jar) may be implemented in a variety of ways. For example, cookie storage 308 may be accessible to a plurality of different applications locally on the client device 106 and also remotely via a network 108. As such, the cookie storage 308 may be maintained locally at the client device 106, remotely via the network 108 as part of a network service, and so on.

At the third stage 306, the cookies 220 are also provided by the token broker module 214 to the application 210 that initially requested the cookies 220, e.g., at the first stage 202 of FIG. 1. The cookies 220 may then be used by the application 210 to access the network service 102. Also, the cookies 220 stored in the cookie storage 308 may also be utilized by other applications to gain this access, such as a browser 118, application 116, and so on. In this way, a single instance of authentication information 218 may be utilized to support access to the network service 102. Further, as is apparent from the discussion in this example this access is obtained without direct communication between the applications 116, 210 locally on the device, and thus may maintain a secure relationship of the operating system 114 (e.g., by maintaining separate "islands" or "sandboxes"), although direct communication is also contemplated.

In this way, a plug-in model may be supported in which network service providers and others who are responsible for user identities may code applications 116 that leverage an underlying infrastructure of the token broker module 214 and single sign-on service 104 to perform authentication. The above mechanism is referred to a push model because applications that perform authentication typically use a form of a cookie called a token, e.g., a web token, whereas cookies are typically utilized by browsers. In this way, the cookies 220 described herein may be leveraged by the token broker module 214 and single sign-on service 104 to bridge that gap between the two. A pull mechanism may also be used, further discussion of which may be found in the following and is shown in corresponding figures.

Figure 4:
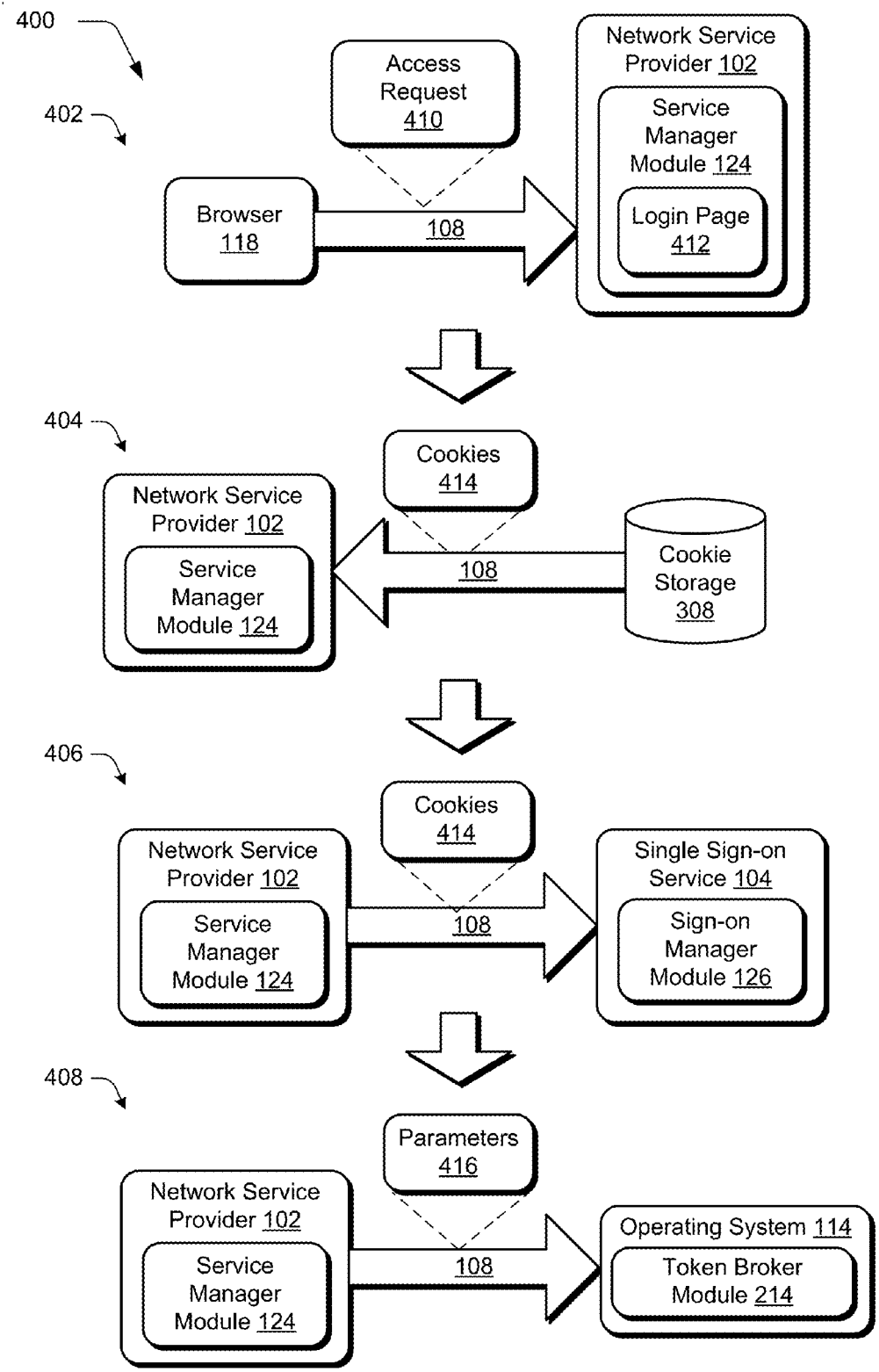
FIG. 4 depicts a system in an example implementation in which a pull mechanism is employed to support single sign-on techniques.

FIG. 4 depicts a system 400 in an example implementation in which a pull mechanism is employed to support single sign-on techniques. In this example, a single sign-on technique is utilized for a browser and an application by leveraging the token broker module 214 and the single sign-on service 104.

At the first stage 402, a user interacts with a browser 118 of the client device 106 of FIG. 1 to form an access request 410 to access a network service provided by network service provider 102, e.g., a social network service, file sharing service, and so forth as previously described. In response, the service manager module 124 of the network service provider 102 may output a login page 412 that is configured to receive authentication information to gain access to the network service, such as a user name and password, gesture, facial recognition, and so on as previously described.

At the second stage 404, the network service provider 102 obtains cookies 414 that correspond to the login page 412 (e.g., from cookie storage 308) and at the third stage 406 provides these cookies 414 via the network 108 to the sign-on manager module 126 of the single sign-on service 104. In another example, the single sign-on service 104 may determine whether a user has already logged on, and if not, send the login page 412 from the single sign-on service 104 and not the network service provider 102

At the fourth stage 408, the network service provider 102 communicates parameters 416 via the network 108 to the token broker module 214 of the operating system 114. For example, the token broker module 214 may pre-register a protocol, e.g., "tbauth://" as part of its configuration as part of the operating system 114, which may be performed to ensure that another entity does not "squat" on the protocol handler. In one or more implementations, application contracts as part of an application store (e.g., online app store) may be configured such that applications do not have the ability to overwrite this protocol through their own configuration. Security mechanisms built into the operating system itself may also be usable to prevent overwriting.

The network service provider 102 may invoke a uniform resource identifier (URI) via a dynamically typed language (e.g., JavaScript®), e.g., "navigator.msLaunchUri," which is routed to the token broker module 214. The URI may take parameters such as a "success" redirect URI that fires as soon as the URI is dispatched successfully (e.g., it has no concept of waiting on the operation "behind" the URI redirect) or a "failure" redirect URI if the specified URI does not exist. Thus, in this example neither the token broker module 214 or the application 116 have a way to "return" parameters to the login page 412 directly. There is also no way for the login page 412 to wait directly on the result of the URI redirect, which is described in further detail below.

The format of the URI may take a variety of forms, such as to follow a WAB (Windows® Address Book) pattern. This means that the network service provider 102 may specify "tbauth://<Provider's page" already registered with "Token Broker>?<Provider-specific parameters>." This allows reuse of the infrastructure already being built for address book forwarding (e.g., Windows® Address Book), specifically URL registration, parsing, and routing to the applications. This also makes it easy for the network service providers 102 to construct the URI, since the network service providers 102 already know how to construct the string for an address book.

Figure 5:
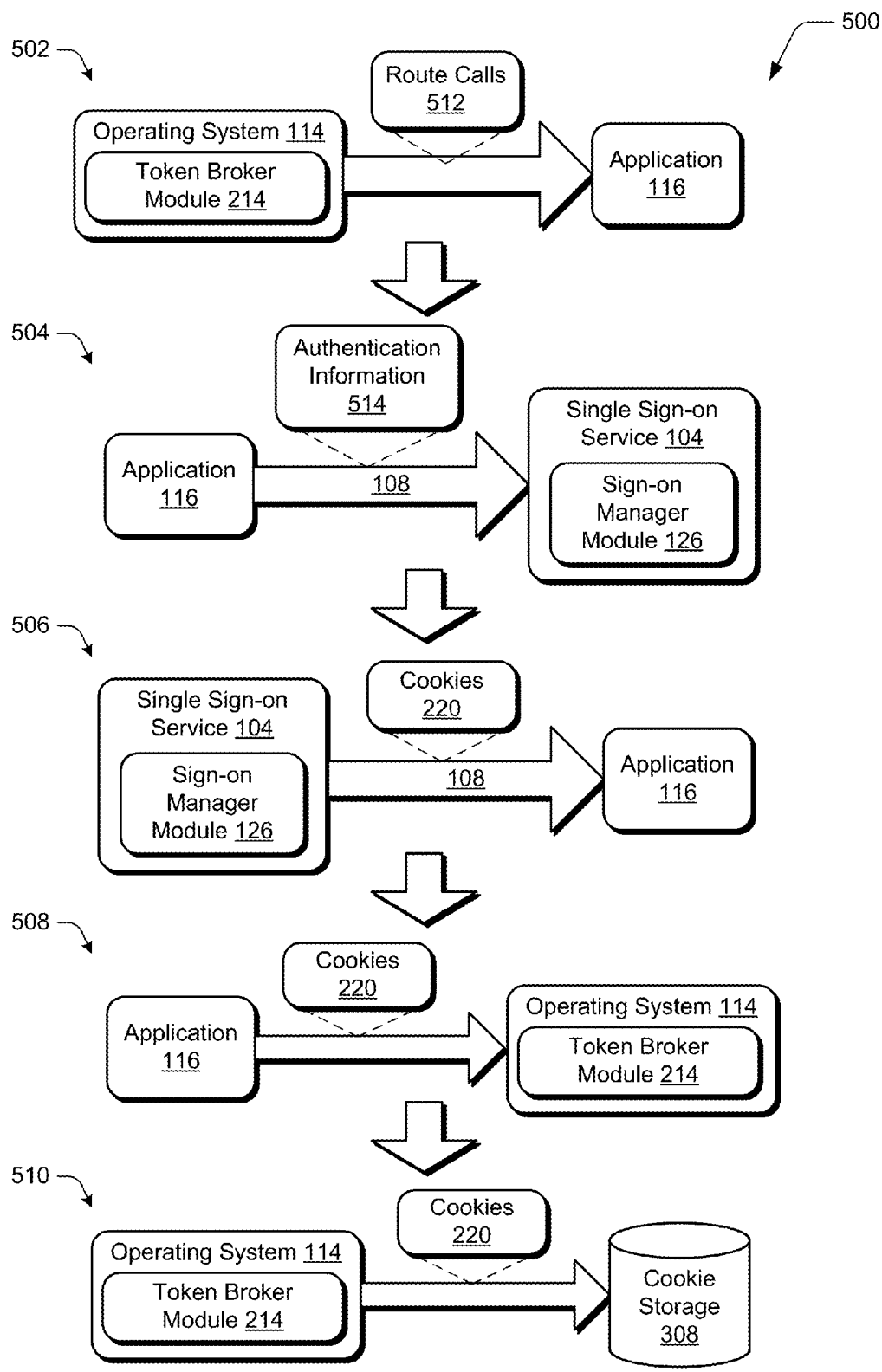
FIG. 5 depicts a system in an example implementation in which cookies are obtained and employed to support single sign-on functionality of a client device to a network service.

FIG. 5 depicts a system 500 in an example implementation in which cookies are obtained and employed to support single sign-on functionality of the client device 106 to the network service 102. The system 500 is illustrated using first, second, third, fourth, and fifth stages 502, 504, 506, 508, 510. Continuing with the previous example, at the first stage 502, the token broker module 214 parses the URI described in relation to FIG. 4. Based on this parsing, the token broker module 214 routes the call 512 to the appropriate application 116, e.g., the dedicated application that corresponds to the network service provider 102.

At the second stage 504, the routed calls may be utilized by the application 116 to collect authentication information 514 (e.g., credentials as previously described), which is then provided via the network 108 to the sign-on manager module 126 of the single sign-on service 104.

At the third stage 506, the single sign-on service 104, upon authentication of the authentication information 514, communicates cookies 220 via the network to the application 116 that are usable to gain access to the network service provider 102, e.g., a corresponding user account.

At the fourth stage 508, the application 116 (e.g., the dedicated application) communicates the cookies to the token broker module 214 of the operating system 114, which are then stored in cookie storage 308 as shown at the fifth stage 510. Thus, at this point the browser 118 of FIG. 4 may then access the cookie storage 308 to obtain access to the requested network service provider 102. Likewise, the application 116 may use the cookies 220 to gain access to the network service provide 102. As such, these techniques may be utilized to support a single sign-on (e.g., involving a single instance of entry of authentication information 514) which may be leveraged by both the application 116 and the browser 118 to access content 120 of the network service provider 102 automatically and without further user intervention.

Thus, in the pull mechanism example above authentication may not be prompted first through the application 116 (e.g., the dedicated application). For example, the application 116 may be associated with a social network service. The first thing a user may perform in this example is to navigate to a network address of the website associated with the network service provider 102 using the browser. At this point, the dedicated application 116 itself is not used for this access, i.e., is not invoked. Consequently, there have been no opportunities for cookies 220 to be pushed and therefore, the browser 118 will not have any cookies 220 waiting for it that may be used to gain access.

Accordingly, a variety of different actions may be taken as described above. For example, a prompt may be output for authentication information 514 (e.g., as part of the login page 412) inside the browser 118, which may then be sent through the token broker module 214 to the application 116 to obtain the cookies 220. In another example, the application 116 itself may output a prompt to receive authentication information 514, instead, which may then obtain the cookies 414 and provide them back in cookie storage 308 for access by the browser 118. In this way, the pull mechanism creates a pipe between the login page 412 and the page's associated application 116 by creating a new protocol handler, referred to as "tbauth" above.

Further, this may be leveraged by a variety of different browsers, e.g., third-party browsers, which may also take advantage of this functionality. For example, the login page 412 may perform a URI activation of "tbauth://" and include whatever parameters 416 are to be passed to the application 116. This may be performed in a manner such that the first part of that URI is the domain name of the network service provider 102 that is also associated with the application 116. This may be passed as configuration information to the token broker module 214 upon installation of the application 116 on the client device 106.

For example, suppose a social network service wants to leverage this on socialnetwork.com, the social network service may instantiate "tbauth://www.socialnetwork.com" and then include whatever parameters are desired along with, which are then passed along to the corresponding application 116. Thus, once the operating system 114 recognizes that "tbauth" is being instantiated, a call may be made to the token broker module 214 indicating receipt of the URI, and to pass it to the correct application 116. The token broker module 214 then parses the domain name, locates an application 116 that corresponds to the domain name, and hands it the parameters. In this way, the token broker module 214 may leverage "tbauth" in this example to support asynchronous communication between the browser 118 and the application 116 to provide single sign-on functionality.

In this example, the network service provider 102 does not use a nonce to avoid making changes to servers of the network service provider 102 to support the nonce. Instead of polling the network service provider 102, the login page simply polls for cookies 220 and the application 116 "returns" the cookies 220 to the page solely by pre-populating the cookie storage 308. Other examples are also contemplated in which a nonce is employed, further discussion of which may be found in the following and is shown in corresponding figures.

Figure 6:
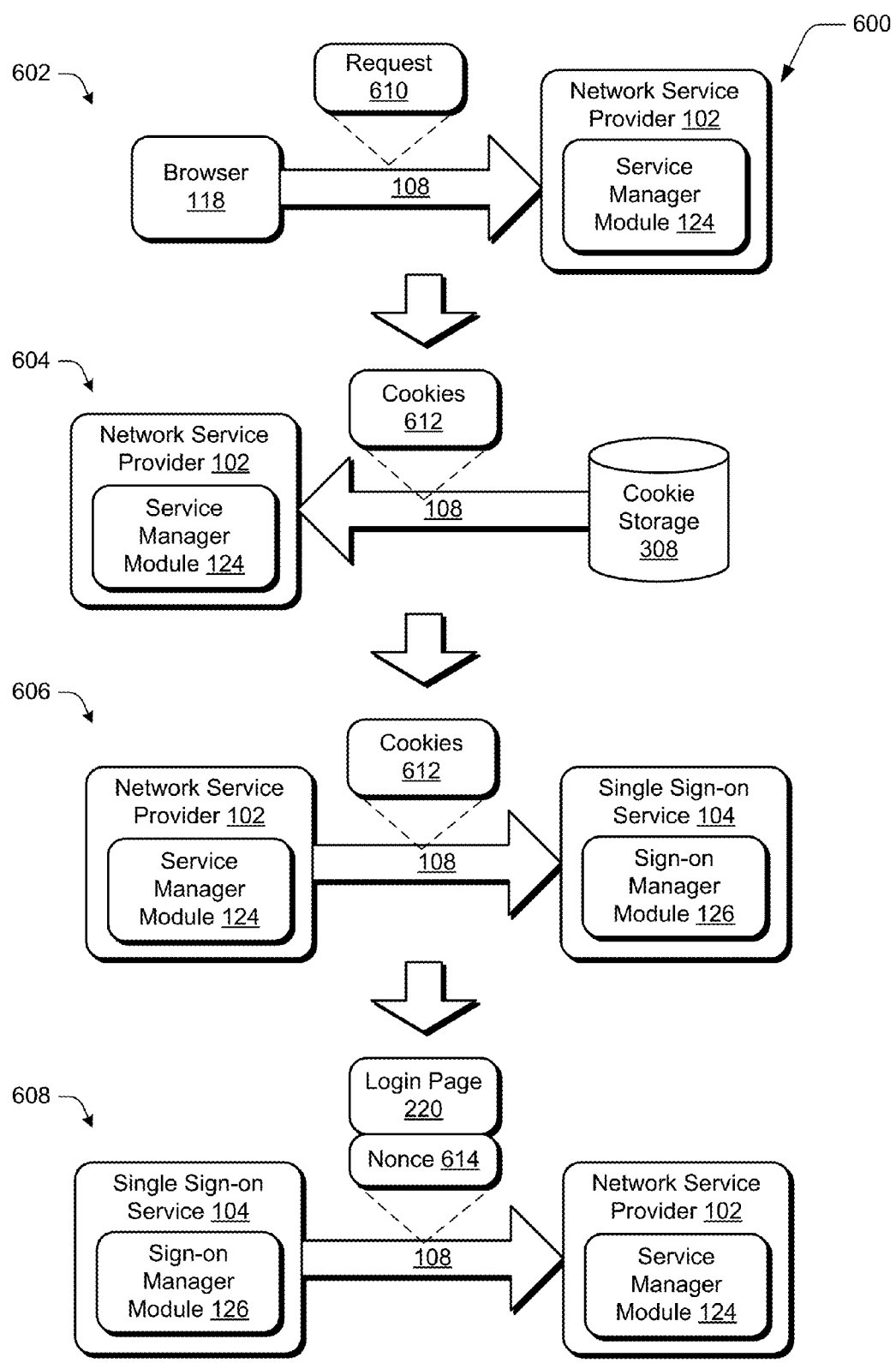
FIG. 6 depicts a system in an example implementation in which support for third-party browsers is shown.

FIG. 6 depicts a system 600 in an example implementation in which support for third-party browsers is shown. The system 600 is illustrated using first, second, third, and fourth stages 602, 604, 606, 608. In this example, support for third-party browsers is provided through access to the cookies that is performed directly from the single sign-on service 104, which may be combined with an ability to pre-populate cookie stores. This example also has the benefit of allowing, at the network service provider's 102 discretion, a first logon via the browser 118 to "pre-plumb" single sign-on for the application 116, since it is actually the applications 116 doing the authentication against the single sign-on service 104 if the network service provider 102 chooses to have the login page forward the request to it. There are several additional challenges that are addressed in the following, including "returning" the cookies 220 to the login page from the application 116 and a protocol employed as part of the single sign-on service 104 to support this.

For example, the network service providers 102 may employ a nonce to address these challenges, which may even be performed without direct communication as previously described, e.g., "navigator.msLaunchUri" is configured such that values are not returned directly to the caller. At the first stage 602, for instance, a browser makes a request 610 to access the network service provider 102 as before. The network service provider 102 may then get cookies 612 (e.g., associated with a login page) from cookie storage 308 as shown at the second stage 604 and communicate those cookies to the single sign-on service 104 as shown at the third stage 606.

At the fourth stage 608, a login page of the network service provider 220 is provided along with a nonce 614 (e.g., an arbitrary number used only once in a cryptographic communication), which used to uniquely identify a request for access in this example. The login page may be provided responsive to a determination that a login page was not already provided by the network service provider 102.

Figure 7:
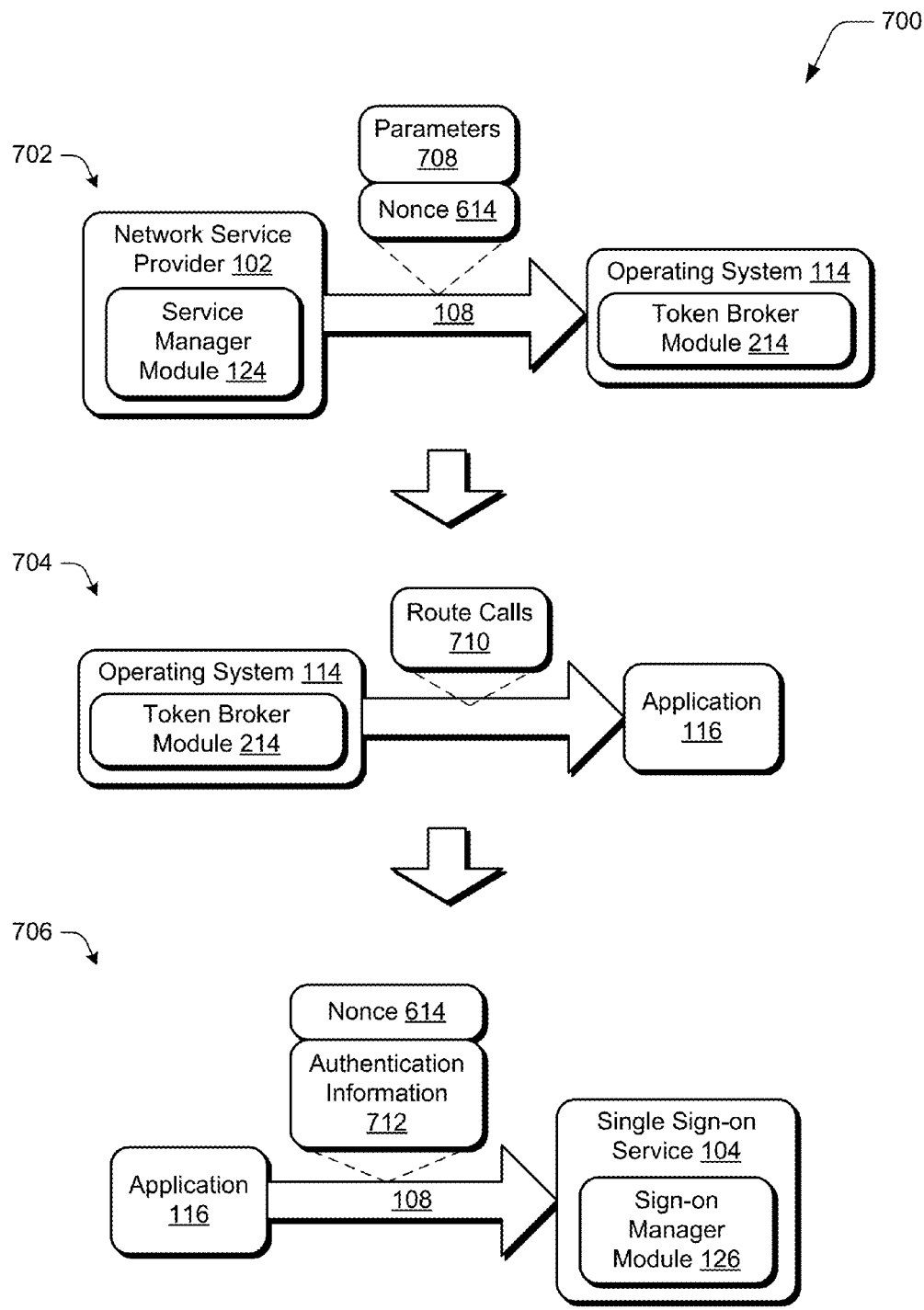
FIG. 7 depicts a system in an example implementation in which a nonce of FIG. 6 is leveraged to support single sign-on techniques.

FIG. 7 depicts a system 700 in an example implementation in which a nonce of FIG. 6 is leveraged to support single sign-on techniques. This system 700 is also illustrated using a plurality of stages, which include first, second, and third 702, 704, 706 stages. At the first stage 702, a login page of a network service provider 102 passes parameters 708 and the nonce 614 using asynchronous URI activation as previously described. For example, the nonce 614 may be appended with the parameters 708 to a URL of the network service provider 102 along with other information, such as a webpage for which the cookies are to be generated in cases in which the network service provider 102 supports multiple login pages, and so on.

At the second stage 704, a token broker module 214 of the operating system 114 locates the application 116 that corresponds to the URI activation and routes calls 710 to the application 116 as previously described. At the third stage 706, the application 116 may then communicate authentication information 712 along with the nonce 614 to the single sign-on service 104 to generate the cookies 220 as further described in the following and shown in a corresponding figure.

Figure 8:
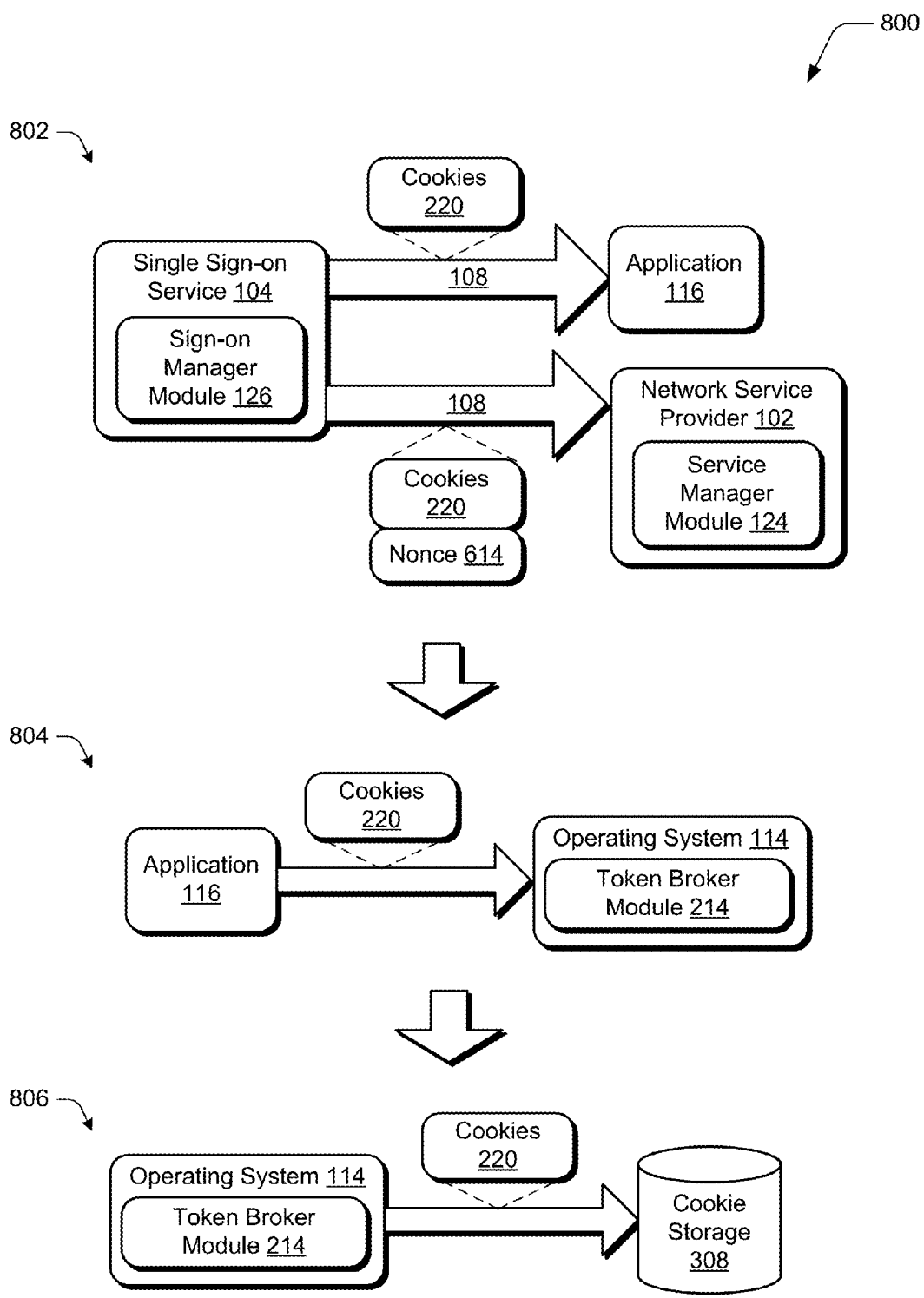
FIG. 8 depicts a system in an example implementation in which cookies are generated and communicated by a single sign-on service in parallel to an application and a network service provider that are usable to permit access to the network service provider.

FIG. 8 depicts a system 800 in an example implementation in which cookies are generated and communicated by the single sign-on service 104 in parallel to the application 116 and the network service provider 102 that are usable to permit access to the network service provider. The system 800 is also illustrated using first, second, and third stages 802, 804, 806. At the first stage 802, the single sign-on service 104 provides cookies 220 to both the application 116 and the network service provider 102 via communications transmitted via the network 108. The communication to the network service provider 102 also includes the nonce 614 and as such, may be utilized as an optimization to avoid additional input/output operations from polling the cookie storage 308.

At the second stage 804, the application 116 communicates the cookies 220 to the token broker module 214, which are then stored in cookie storage 308 as shown in the fourth stage 806. The application 116, for instance, may perform this proactively as part of a "get token" path, instead of solely reactively on the browser single sign-on path.

Thus, in this example, the authentications are processed through the application 116, which may employ the nonce 614 to track state, e.g., to identify relevant information associated with a request. The single sign-on service 104 acts as a "go between" for the browser 118 and the application 116 and thus these techniques may be performed without direct communication and support use of third-party browsers. Further discussion of these and other examples may be found in relation to the following procedures.

Example Procedures

The following discussion describes single sign-on techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the figures described above.

Functionality, features, and concepts described in relation to the examples of FIGS. 1-8 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

Figure 9:
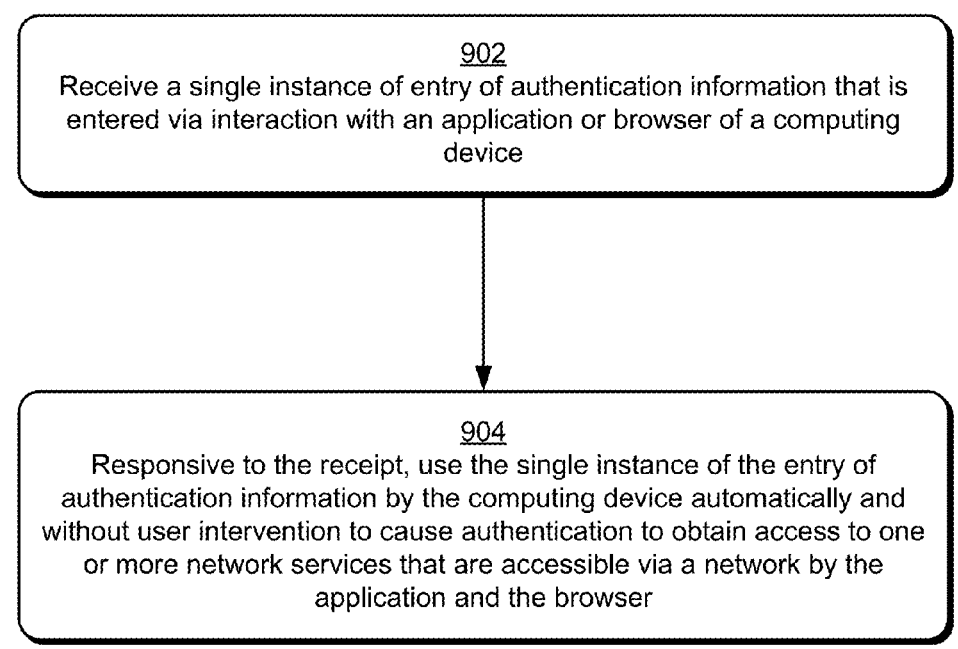
FIG. 9 is a flow diagram depicting a procedure in an example implementation in which a single instance of authentication information is utilized to support a single sign-on of a browser and application

FIG. 9 depicts a procedure 900 in an example implementation in which a single instance of authentication information is utilized to support a single sign-on of a browser and application. A single instance of entry of authentication information is received that is entered via interaction with an application or browser of a computing device (block 902). A user, for instance, may enter authentication information 218 via interaction with the application 116 or browser 118, e.g., by accessing a website.

Responsive to this receipt, the single instance of the entry of authentication information is used by the computing device automatically and without user intervention to cause authentication to obtain access to one or more network services that are accessible via a network by the application and the browser (block 904). The client device 106, for instance, may leverage a single sign-on service 104 and token broker module 214 to utilize single sign-on techniques as described above, which may be leveraged by the application 116 and browser 118, multiple applications, and so on as described above.

Figure 10:
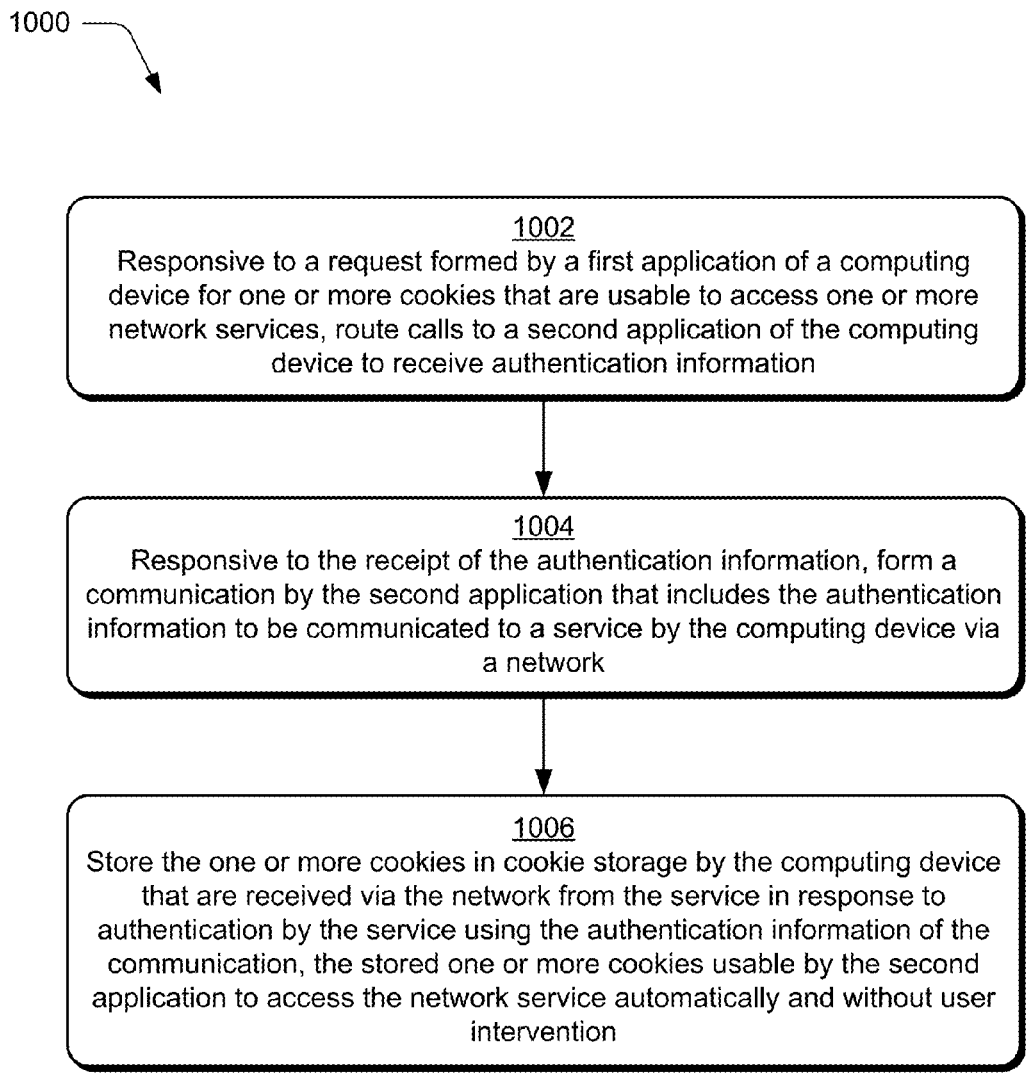
FIG. 10 is a flow diagram depicting a procedure in an example implementation in which a push mechanism utilized to support single sign-on techniques is described.

FIG. 10 depicts a procedure 900 in an example implementation in which a push mechanism utilized to support single sign-on techniques is described. Responsive to a request formed by a first application of a computing device for one or more cookies that are usable to access one or more network services, calls are routed to a second application of the computing device to receive authentication information (block 1002). As shown in FIG. 2, for instance, at the second stage 204 calls are routed by the token broker module 214 to application 116 in response to a request to access a network service by another application 210.

Responsive to the receipt of the authentication information, a communication is formed by the second application that includes the authentication information to be communicated to a service by the computing device via a network (block 1004). The application 116, for instance, may communicate the authentication information 218 via the network 108 to the single sign-on service 104.

The one or more cookies that are received via the network from the service in response to authentication by the service using the authentication information of the communication are stored in cookie storage by the computing device. The stored one or more cookies are usable by the second application to access the network service automatically and without user intervention (block 1006). Continuing with the previous example, the application 116 may receive cookies responsive to verification of the authentication information, which are then provided to the token broker module 214 for storage in cookie storage 308, i.e., a cookie jar. These cookies 220 may then be accessed by both the application 210 as well as application 116 to gain access to the network service provider 102.

FIG. 11 depicts a procedure 1100 in an example implementation in which a pull mechanism utilized to support single sign-on techniques is described. Responsive to a request for one or more cookies from a browser of a computing device that is usable to access one or more network services, an application is caused to form a communication that includes authentication information to be communicated to a service by the computing device via a network (block 1102). The application 116, for instance, may communicate authentication information 514 to the single sign-on service 104 as shown at the second stage 504 of FIG. 5.

The one or more cookies received by the application, responsive to the formed communication, are caused to be stored in cookie storage by the computing device such that the one or more cookies are usable by the browser and the application to access the one or more network services automatically and without user intervention (block 1104). Continuing with the previous example, the application 116 may receive cookies responsive to verification of the authentication information, which are then provided to the token broker module 214 for storage in cookie storage 308, i.e., a cookie jar. These cookies 220 may then be accessed by both the application 116 as well as the browser 118 to gain access to the network service provider 102. A variety of other examples are also contemplated.

Example System and Device

Figure 12:
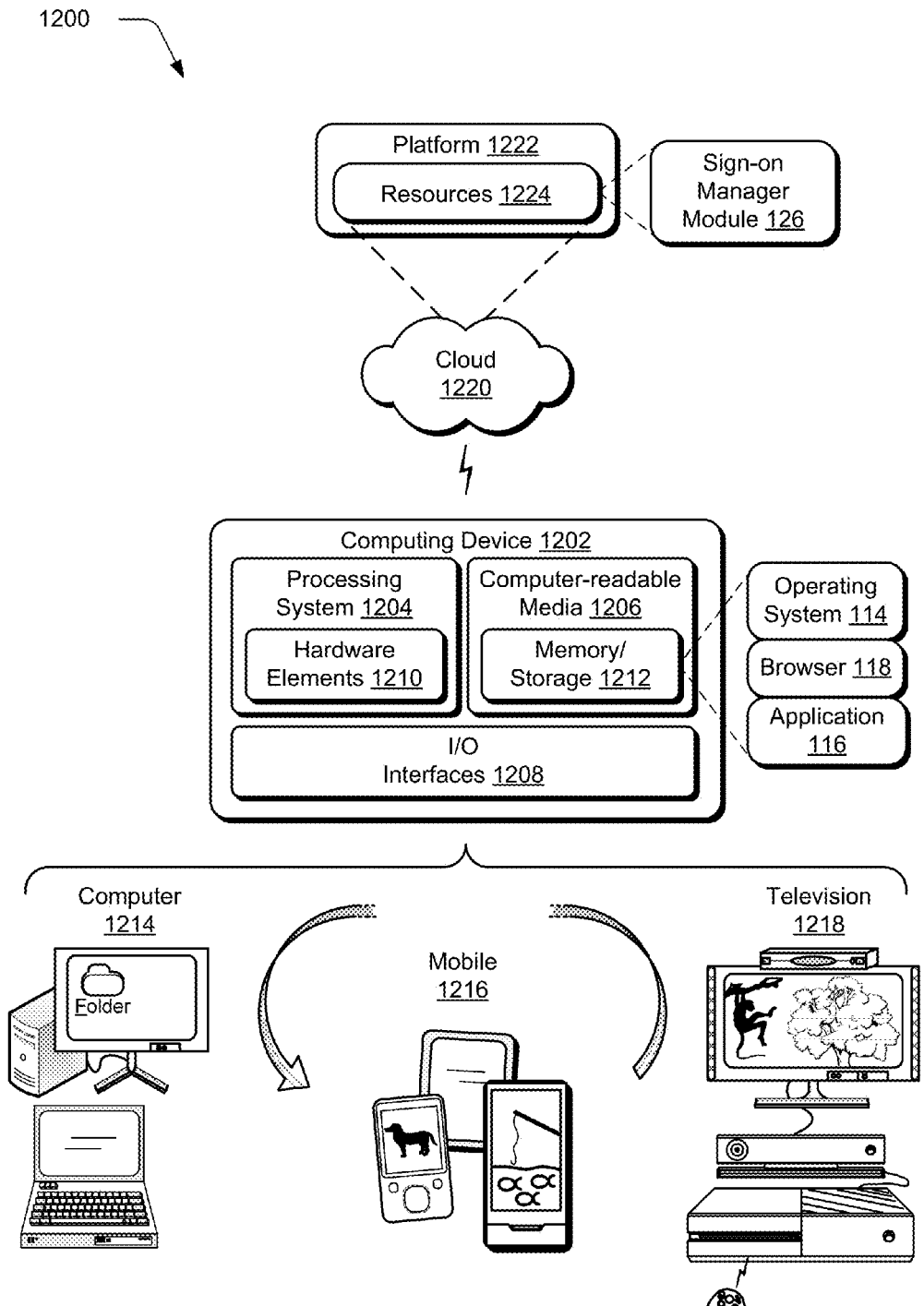
FIG. 12 illustrates an example system including various components of an example device that can be implemented as any type of computing device as described with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. This is illustrated through inclusion of the sign-on manager module 126, the operating system 114, the browser 118, and the application 116. The computing device 1202 maybe, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

As further illustrated in FIG. 12, the example system 1200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1202 may assume a variety of different configurations, such as for computer 1214, mobile 1216, and television 1218 uses. Each of these configurations includes devices that may have generally different constructs and capabilities, and thus the computing device 1202 may be configured according to one or more of the different device classes. For instance, the computing device 1202 may be implemented as the computer 1214 class of a device that includes a personal computer, desktop computer, a multi-screen computer, laptop computer, netbook, and so on.

The computing device 1202 may also be implemented as the mobile 1216 class of device that includes mobile devices, such as a mobile phone, portable music player, portable gaming device, a tablet computer, a multi-screen computer, and so on. The computing device 1202 may also be implemented as the television 1218 class of device that includes devices having or connected to generally larger screens in casual viewing environments. These devices include televisions, set-top boxes, gaming consoles, and so on.

The techniques described herein may be supported by these various configurations of the computing device 1202 and are not limited to the specific examples of the techniques described herein. This functionality may also be implemented all or in part through use of a distributed system, such as over a "cloud" 1220 via a platform 1222 as described below.

The cloud 1220 includes and/or is representative of a platform 1222 for resources 1224. The platform 1222 abstracts underlying functionality of hardware (e.g., servers)

and software resources of the cloud 1220. The resources 1224 may include applications and/or data that can be utilized while computer processing is executed on servers that are remote from the computing device 1202. Resources 1224 can also include services provided over the Internet and/or through a subscriber network, such as a cellular or Wi-Fi network.

The platform 1222 may abstract resources and functions to connect the computing device 1202 with other computing devices. The platform 1222 may also serve to abstract scaling of resources to provide a corresponding level of scale to encountered demand for the resources 1224 that are implemented via the platform 1222. Accordingly, in an interconnected device embodiment, implementation of functionality described herein may be distributed throughout the system 1200. For example, the functionality may be implemented in part on the computing device 1202 as well as via the platform 1222 that abstracts the functionality of the cloud 1220.

CONCLUSION AND EXAMPLE IMPLEMENTATIONS

Example implementations described herein include, but are not limited to, one or any combinations of one or more of the following examples:

A method comprising receiving a single instance of entry of authentication information that is entered via interaction with an application or browser of a computing device; and responsive to the receiving, using the single instance of the entry of authentication information by the computing device automatically and without user intervention to cause authentication to obtain access to one or more network services that are accessible via a network by the application and the browser.

A method as described above, wherein the one or more network services are configured as a website and the second application is configured as a dedicated application that is associated with the website.

A method as described above, wherein entry of the authentication information via interaction with the application is usable to cause both the application and the browser to be authenticated for access to the one or more network services without further user interaction.

A method as described above, wherein entry of the authentication information via interaction with the browser is usable to cause both the browser and the application to be authenticated for access to the one or more network services without further user interaction.

A method as described above, wherein the using is performed without direct communication between the application and the browser at the computing device.

A method as described above, wherein the direct communication involves passing of the authentication information between the browser and the application.

A method as described in above, wherein the using is performed through interaction of the application and the browser with a single sign-on service that is accessible via the network.

A method as described in above, wherein the single sign-on service is not part of the one or more network services.

A method as described in above, wherein the using includes using a nonce provided by the single sign-on service.

A method comprising responsive to a request formed by a first application of a computing device for one or more cookies that are usable to access one or more network services, routing calls to a second application of the computing device to receive authentication information; responsive to the receipt of the authentication information, forming a communication by the second application that includes the authentication information to be communicated to a service by the computing device via a network; and storing the one or more cookies in cookie storage by the computing device that are received via the network from the service in response to authentication by the service using the authentication information of the communication, the stored one or more cookies usable by the second application to access the network service automatically and without user intervention.

A method as described above, further comprising communicating the one or more cookies by the computing device to the first application, the one or more cookies usable by the first application to access the one or more network services via the network.

A method as described above, wherein the communicating is performed using the cookie storage.

A method as described above, wherein the communicating is performed without using the cookie storage.

A method as described above, wherein the one or more networks services are configured as a website and the application is configured as a dedicated application that is associated with the website.

A method comprising responsive to a request for one or more cookies from a browser of a computing device that is usable to access one or more network services, causing an application to form a communication that includes authentication information to be communicated to a service by the computing device via a network; and communicating the one or more cookies received by the application, responsive to the formed communication, to be stored in cookie storage by the computing device such that the one or more cookies are usable by the browser and the application to access the one or more network services automatically and without user intervention.

A method as described above, wherein the communicating is performed without direct communication between the application and the browser.

A method as described above, wherein the direct communication involves passing of the authentication information directly between the application and the browser.

A method as described above, wherein the one or more networks services are configured as a website and the application is configured as a dedicated application that is associated with the website.

A method as described above, wherein the causing and the communicating are performed by a token broker module of an operating system of the computing device.

A method as described above, wherein the formed communication includes a nonce received by the browser.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method of performing a single sign-on to control access to a network service and first and second applications of a computing device, the method comprising:
   responsive to a request formed by the first application of the computing device for one or more cookies that are usable to access one or more network services, routing calls to the second application of the computing device to receive authentication information, wherein the first application and the second application are both distinct from any browser executed by the computing device;

responsive to the receipt of the authentication information, forming a communication by the second application that includes the authentication information to be communicated to a service by the computing device via a network; and storing the one or more cookies in cookie storage by the computing device that are received via the network from the service in response to authentication by the service using the authentication information of the communication, the stored one or more cookies usable by the second application to access the one or more network services automatically and without user intervention.

2. The method of claim 1, further comprising communicating the one or more cookies by the computing device to the first application, the one or more cookies usable by the first application to access the one or more network services via the network.

3. The method of claim 1, wherein the communicating is performed using the cookie storage.

4. The method of claim 1, wherein the communicating is performed without using the cookie storage.

5. The method of claim 1, wherein the one or more network services are configured as a website and the second application is configured as a dedicated application that is associated with the website.

6. The method of claim 1, wherein the request is sent to an operating system of the computing device distinct from any browser executed by the computing device.

7. The method of claim 1, wherein the access is obtainable without direct communications between the first application and the second application.

8. A memory device having program instructions stored thereon that, upon execution by a processor of a computing device, cause the computing device to:

responsive to a request formed by a first application of the computing device and sent to an operating system of the computing device for one or more cookies that are usable to access one or more network services, route calls to a second application of the computing device to receive authentication information, wherein the first application and the second application are both distinct from any browser executed by the computing device;

responsive to the receipt of the authentication information, form a communication by the second application that includes the authentication information to be communicated to a service by the computing device via a network; and store the one or more cookies in cookie storage by the computing device that are received via the network from the service in response to authentication by the service using the authentication information of the communication, the stored one or more cookies usable by the second application to access the one or more network services automatically and without user intervention.

9. The memory device of claim 8, wherein the program instructions, upon execution by the processor, further cause the computing device to communicate the one or more cookies by the computing device to the first application, the one or more cookies usable by the first application to access the one or more network services via the network.

10. The memory device of claim 8, wherein the communication is performed using the cookie storage.

11. The memory device of claim 8, wherein the communication is performed without using the cookie storage.

12. The memory device of claim 8, wherein the one or more network services are configured as a website and the second application is configured as a dedicated application that is associated with the website.

13. A computer system, comprising:

a processor; and a memory coupled to the processor, the memory having program instructions stored thereon that, upon execution by the processor, cause the computer system to:

responsive to a request formed by a first application of the computer system for one or more cookies that are usable to access one or more network services, route calls to a second application of the computer system to receive authentication information, wherein the access is obtainable without direct communications between the first application and the second application, wherein the first application and the second application are both distinct from any browser executed by the computer system;

responsive to the receipt of the authentication information, form a communication by the second application that includes the authentication information to be communicated to a service by the computer system via a network; and store the one or more cookies in cookie storage by the computer system that are received via the network from the service in response to authentication by the service using the authentication information of the communication, the stored one or more cookies usable by the second application to access the one or more network services automatically and without user intervention.

14. The computer system of claim 13, wherein the program instructions, upon execution by the processor, further cause the computer system to communicate the one or more cookies by the computer system to the first application, the one or more cookies usable by the first application to access the one or more network services via the network.

15. The computer system of claim 13, wherein the communication is performed using the cookie storage.

16. The computer system of claim 13, wherein the communication is performed without using the cookie storage.

17. The computer system of claim 13, wherein the one or more network services are configured as a website and the second application is configured as a dedicated application that is associated with the website.

* * * * *